March 24, 1970  J. R. WILLSON ET AL  3,502,101
THERMOSTATIC CONTROL DEVICE WITH A PRESSURE
REGULATED STEPPED OPENED
DIAPHRAGM VALVE
Filed June 19, 1968  2 Sheets-Sheet 1

INVENTOR
JAMES R. WILLSON

Christen, Sabol & O'Brien
ATTORNEYS

INVENTOR
JAMES R. WILLSON

Christen, Sabel & O'Brien
ATTORNEYS

United States Patent Office 3,502,101
Patented Mar. 24, 1970

3,502,101
THERMOSTATIC CONTROL DEVICE WITH A PRESSURE REGULATED STEPPED OPENED DIAPHRAGM VALVE
James R. Willson, Garden Grove, and Lauren D. Haskins, Long Beach, Calif., assignors to Robertshaw Controls Company, Richmond, Va., a corporation of Delaware
Filed June 19, 1968, Ser. No. 738,225
Int. Cl. F24c 3/12; F16k 31/145, 31/42
U.S. Cl. 137—495                        10 Claims

ABSTRACT OF THE DISCLOSURE

A control device for burner apparatus having a differential pressure operated diaphragm valve operated by an internal bleed system which is subjected to pressure regulation and to on-off control by a dual valve arrangement.

Initial operation of the on-off valve provides a step input at a reduced rate under pressure regulation which assures good ignition without "roll out" at the main burner. Full input is delayed until the bleed line fills a reservoir.

BACKGROUND OF THE INVENTION

Field of the invention

This invention relates to the control and pressure regulation of fuel flow to burner apparatus, and in particular, to a combination control device which permits pressure regulation of a step opening valve.

Description of the prior art

The prior art is exemplified by U.S. Patents No. 3,090,592, No. 3,135,281, No. 3,236,261, No. 3,247,868, No. 3,300,174, No. 3,304,002, and No. 3,307,785. The prior art is cognizant of the general arrangement of diaphragm operated valve systems which have bleed line controls that provide a stepped low flow rate, a time delay, and a high flow rate at the main valve. The known prior art devices require complex operating mechanisms, duplicity of operating components, and fail to provide pressure regulation at both the step and full inputs.

SUMMARY OF THE INVENTION

In practicing the present invention, a control device is provided with an inlet and an outlet and a differential pressure operating diaphragm valve for controlling and regulating the pressure of a fluid flow therebetween; the diaphragm valve is operated on the bleed line principle with an automatically bleed valve controlling the bleed flow and with a pressure regulator regulating the pressure of the bleed flow. The bleed flow to the pressure regulator is initially stepped to a low flow rate and then to a high flow rate with a time delay therebetween effected by a bleed flow reservoir.

An object of the present invention is to provide a control device with both stepped input and full input control by means of a single bleed pressure regulator.

Another object of this invention is to regulate the pressure of an initial flow as well as the normal flow through a combination control device.

Other objects and advantages of the present invention will become apparent from the following description taken in conjunction with the accompanying drawings.

DESCRIPTION OF THE PREFERRED EMBODIMENT

Figure 1:
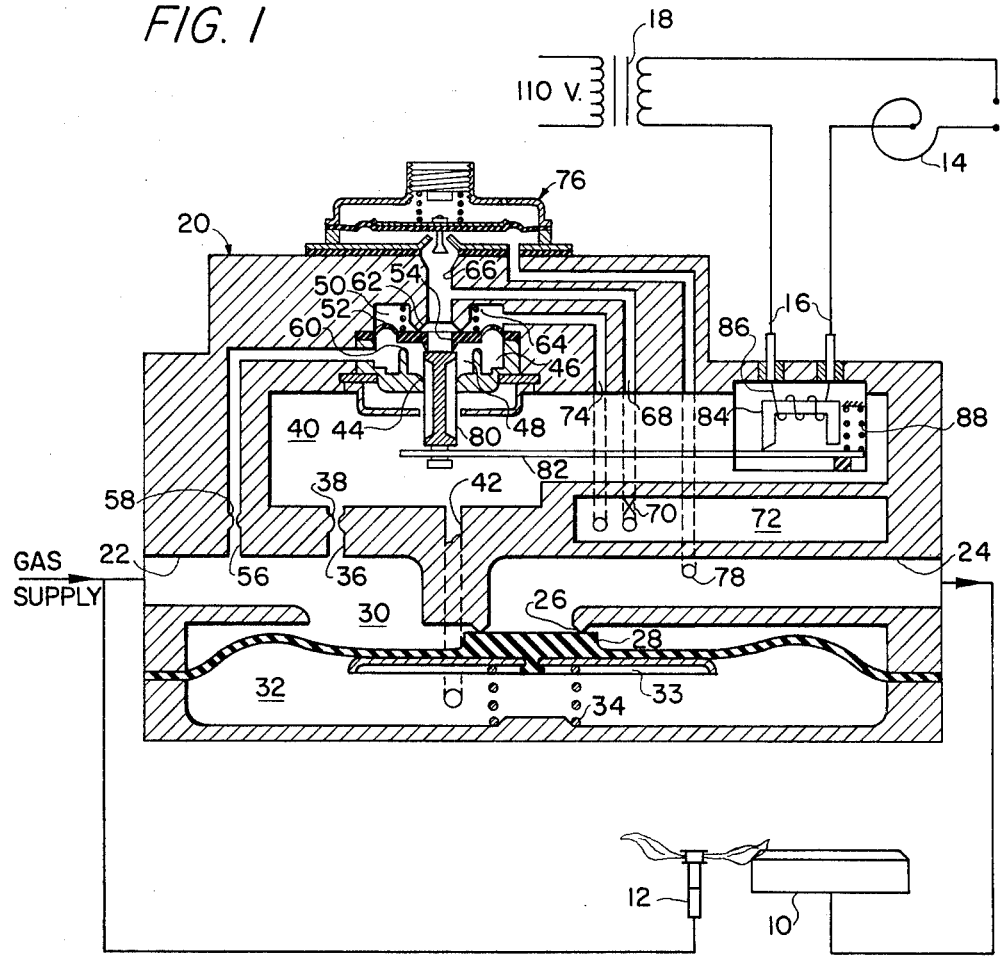
FIG. 1 is a vertical cross section of a combination control device schematically associated with burner apparatus and showing the various components in their off position.

While the present invention is applicable to various types of controls for heating and/or cooling apparatus, it will be described in connection with burner apparatus of the heating type. Such apparatus, as shown in FIG. 1, includes a main burner 10 and a pilot burner 12 located in igniting proximity to the main burner 10 and connected to a fuel source such as a gas supply. As is well known in the art, a thermoelectric pilot safety valve (not shown) may be included in the gas supply line. The main burner 10 is part of a furnace (not shown) supplying heat to a particular area which includes any suitable type of temperature responsive element. In the form illustrated the temperature responsive element is a bimetal switch 14 serially connected to the terminals 16 of an electric actuator and to the secondary winding of a transformer 18, which is connected to any suitable power supply, such as a 110 volt source.

The flow of fuel to the main burner 10 is controlled by a combination control device embodied in a hallowed casing indicated generally at 20 having an inlet port 22 on one end connected to the gas supply and an outlet port 24 on an opposite end connected to the main burner 10 by a suitable conduit. The inlet and outlet ports 22 and 24 are disposed on a common axis with a valve seat 26 intermediately located therebetween. A flow through the valve seat 26 is controlled by a flexible diaphragm defining a main valve member 28. The periphery of the diaphragm valve 28 is clamped between adjacent sections of the casing 20, which are secured together as by cap screws (not shown). The main diaphragm valve 28 separates a hollow cavity of the casing into an inlet pressure chamber 30 and an operating pressure chamber 32. A back-up plate 33 is secured to the undersurface of diaphragm 28 and a coil spring 34 is mounted in compression between the bottom casing wall of the operating pressure chamber 32 and the back-up plate 33 whereby the diaphragm valve 28 is biased toward engagement with the valve seat 26.

A bleed flow passage 36 having a flow restricting orifice 38 establishes communication between the inlet port 22 and a bleed flow chamber 40 which communicates with the operating pressure chamber 32 by means of a bleed passageway 42. One wall of chamber 40 has a circular opening 44 leading to a bleed valve chamber 46 which is separated into first and second cavities 48 and 50, respectively, by means of a differential pressure operated valving element in the form of a diaphragm 52. The diaphragm 52 is sealed and mounted at its periphery and has a thickened central portion to define dual valve faces and a flow aperture 54 centrally extending through the thickened portion.

Parallel to the primary bleed flow passage 36 is a secondary bleed flow passage 56 having a flow restricting orifice 58, which extends from the inlet port 22 and terminates in an annular seat or port 60 leading to the first cavity 48. One side of diaphragm 52 cooperates with the port 60 while its opposite side cooperates with the second annular seat or port 62 in the second cavity 50. When pressure in the cavities 48 and 50 is equalized, the dual valving element 52 is biased into engagement with the first port 60 by a light coil spring 64 mounted in compression in the second cavity 50.

The second port 62 opens into a bleed line passage 66; intermediate the ends of passage 66 communication is established with a reservoir inlet conduit 68 which has a flow restricting orifice 70. The inlet conduit 68 opens into a bleed flow delay reservoir 72 that has an outlet conduit 74 leading to the second cavity 50. A bleed flow from the bleed line passage 66 is controlled by a pressure regulator 76 and an outlet bleed line 78 establishes communication between the outlet side of the regulator 76 and the main outlet port 24. The pressure regulator may be of any conventional type such as shown in FIG. 1 which includes a regulating valve regulating the bleed line flow from passage 66 into a regulating chamber which communicates with the bleed line outlet passage 78. A movable wall of the regulating chamber is defined by a flexible diaphragm having one side attached to the regulating valve and its opposite side being subject to atmospheric pressure by a suitable vent in the regulating housing. A coil spring biases such opposite side of the flexible diaphragm and the biasing force is adjustable by a set screw in the cover member on the top of the regulator housing.

Figure 2:
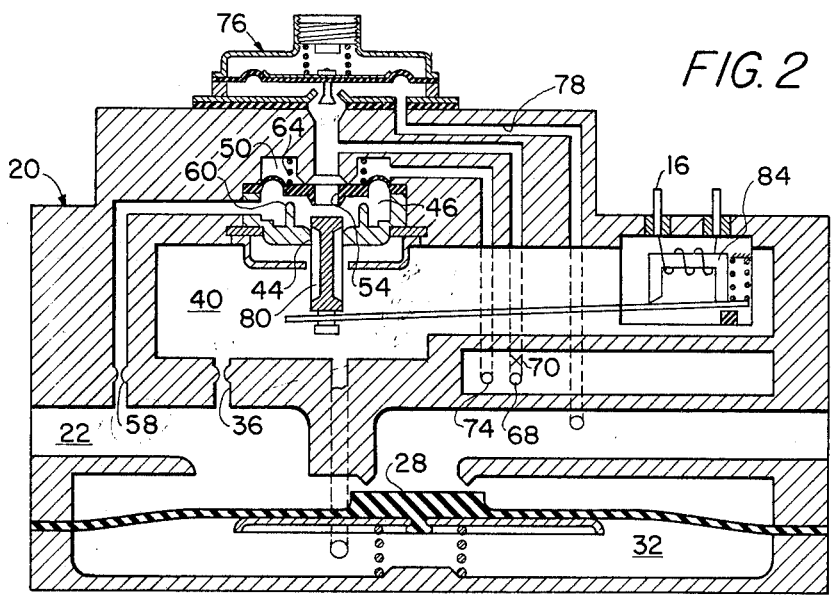
FIG. 2 is a vertical cross section of the device of FIG. 1, but showing the operating components in their initial open position.
Figure 3:
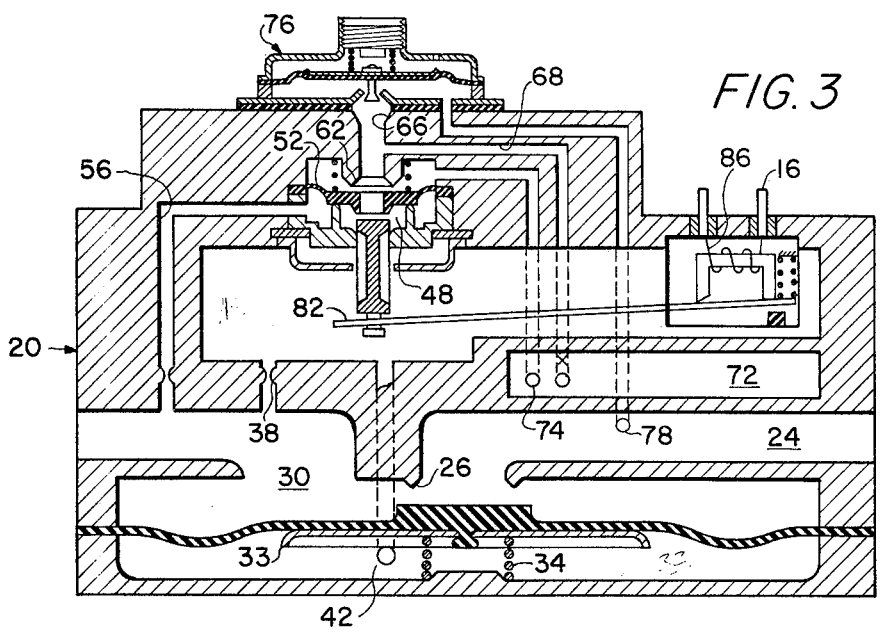
FIG. 3 is a vertical cross section similar to FIG. 2, but showing the operating components in their full open position.

As is illustrated in FIGS. 1–3, the opening 44 receives a valve actuator element 80 in the form of a plunger rod or shaft having a non-circular cross section that permits continuous communication between the bleed flow chamber 40 and the first cavity 48. One end of the actuator rod 80 cooperates with the diaphragm 52 to move the same against the second port 62 and to close the flow aperture 54. The opposite end of the actuator rod 80 is disposed in the bleed flow chamber 40 and is suitably notched to be operatively connected to the end of an armature lever 82.

The actuator rod 80 and armature lever 82 are parts of automatic actuating means which may be of any conventional type, such as an hydraulically operated thermostatic device, a heat motor thermostatic device, etc. The particular device shown in FIGS. 1–3 comprises an electromagnetic actuator including an electromagnet 84 having one leg defining a fulcrum for the adjacent end portion of the armature lever 82. An energizing coil 86 is wound on the electromagnet and is serially connected to the leads 16 whereby the energization of the electromagnet 84 is controlled by the bimetal switch 14. The free end of the armature lever 82 is biased against a rubber bumper or any suitable stop element by means of a coil spring 88 so that upon deenergization of the electromagnet 84 the armature lever 82 is moved clockwise to its off position.

In the following description of a sequence of operation, it is assumed that the main burner 10 is located in a furnace (not shown) supplying heat to a space in which the thermostat 14 is located. FIG. 1 shows the off condition of the control elements inasmuch as the bimetal switch 14 is in an open condition indicating that the heat requirements for such space have been satisfied. As shown in FIG. 1, the actuator rod 80 is in its off position causing closure of the flow aperture 54 and the second port 62 so there is no bleed flow from the bleed flow chamber 40; at this time the first port 60 is open so there is communication between the bleed flow chamber 40 and both the primary and secondary bleed passages 36 and 56, respectively. Since bleed passage 42 is always open between chambers 32 and 40, the operating pressure chamber 32 is subject to inlet pressure; with such pressure equalization between the chambers 30 and 32, the coil spring 34 biases the diaphragm valve 28 to its closed position against the main valve seat 26.

Assuming now that there is a demand for heat in the space being temperature controlled, the bimetal switch 14 closes to complete an energizing circuit for the solenoid coil 86. As is shown in FIG. 2, the energization of the electromagnet 84 causes counterclockwise pivoting of the armature lever 82 whereby the actuator rod 80 is moved to its on position. Thus, the flow aperture 54 is opened so there is a bleed flow from the first cavity 48 through the second port 62, the passage 66, the pressure regulator 76 and the bleed outlet passage 78 to the main outlet port 24; diaphragm valve 52 remains seated on the second port 62 due to the pressure drop caused by the relatively large flow through the secondary bleed flow passage 56 relative to flow through flow aperture 54. The bleed line regulator 76 regulates the main outlet pressure at a relatively low outlet pressure due to the combined feed of the primary and second bleed flow passages 36 and 56. The low flow rate at the stepped opening is dependent primarily on the relative size of the secondary bleed orifice 58; i.e., the larger the orifice 58 the lower the step input. The large flow through orifice 58 creates a relatively high pressure behind diaphragm 32. This causes seat 28 to move towards its closed position, thus causing a pressure drop in the outlet. The pressure drop is felt by the sensing regulator 76, and the metering valve in the sensing regulator moves toward its open position. The sensing regulator must have a high rate spring so that as its metering valve moves toward its open position, the spring extends so that it exerts a smaller force on the sensing regulator diaphragm. Because of its high rate spring the sensing regulator assumes lower pressure control points as flow through the sensing regulator is increased. If desired, the orifice 58 may be adjustable in order to vary the step input to conform to various burner requirements.

The stepped opening position (FIG. 2) of the main diaphragm valve 28 supplies a flow of fuel to the main burner 10 at a low rate sufficient to permit ignition and not great enough to over supply the burner 10 which would cause roll-out of the entire flame. Once the main burner 10 is ignited, with a low flame, it is desired to supply the burner with a full rate of flow in accordance with the burner capacity. It is thus apparent that there is need for a slight time delay after the time the initial low flame is established before supplying a full rate of flow. This time delay is accomplished by the same bleed valve control which initiates the low flow rate. As is shown in FIG. 2, after initial movement of the actuator rod 80 to its on position, a bleed flow is traced from the the passage 66 through the reservoir inlet 68 and its restricting orifice 70 into the delay reservoir 72; once the delay reservoir 72 is filled, the bleed flow proceeds therefrom from the reservoir outlet 74 into the second cavity 50 pressurizes the top of the diaphragm valve 52.

At the pressure on the two sides of the dual seat diaphragm valve 52 becomes equalized, the light force spring 64 moves the diaphragm valve 52 downward to close the first port 60 and thus shuts off the secondary bleed passage 56. The position of the controlling components are now positioned as shown in FIG. 3 wherein the bleed flow chamber 40 and the operating pressure chamber 32 is bled into the first cavity 48 thence through the flow aperture 54, the second port 62 and the passage 66 to the pressure regulator 76. At this time the second cavity 50 is also opened to second port 62 so equal pressure exits in the operating pressure chamber 32, the bleed flow chamber 40, the lower cavity 48, the upper cavity 50, the bleed passage 60 and the bleed reservoir 72. This lowering of pressure in the operating pressure chamber 32 causes the main diaphragm valve 28 to be moved to its high rate flow open position because of the greater inlet pressure in the inlet chamber 30. As is shown in FIG. 3, the full open position of the main diaphragm 28 supplies a higher rate of fuel to the main burner 10 permitting the flame to be increased to its high rate position.

It should be noted that all of the bleed line control components, which effect operation of the main diaphragm valve 28, are located upstream of the bleed line pressure regulator 76. This has the particular advantage in that both step input and full input pressure regulation is accomplished with a single bleed line pressure regulator; i. e., the low rate of flow is pressure regulated as well as the high rate of flow. By the simple method of opening the bleed line upon initial actuation, the present invention permits automatic pressure regulation of a flow of fuel to the burner apparatus.

What is claimed is:
1. In a control device for supplying a fuel flow to burner apparatus, the combination comprising a casing having inlet and outlet means and main valve means for controlling a flow therebetween,
diaphragm means associated with said main valve means for moving the same,
said diaphragm means cooperating with a wall portion of said casing to define an operating pressure chamber whereby pressure variations therein cause operation of said main valve means,
a bleed flow chamber communicating with said operating pressure chamber,
a primary bleed flow passage between said inlet means and said bleed flow chamber,
a bleed valve chamber having an opening communicating with said bleed flow chamber and having first and second ports,
a secondary bleed flow passage between said inlet means and said first port,
bleed line means between said second port and said outlet means,
pressure responsive valving means in said bleed valve chamber having a first position wherein said first port is open and said second port is closed, and having a second position wherein said first port is closed and said second port is open,
automatic actuating means retaining said valving means in its first position and upon actuation permitting said bleed valving means to move to its second position,
flow delay means cooperating with said valving means to effect delayed movement thereof to its second position, and
pressure regulating means in said bleed line means downstream of said second port and said flow delay means whereby any flow in said bleed line means to said outlet means is subject to pressure regulation.

2. The invention as recited in claim 1 wherein said flow delay means includes a bleed line reservoir having an inlet communicating with said bleed line means and an outlet communicating with one side of said valving means.

3. The invention as recited in claim 1 wherein said pressure responsive valving means includes a diaphragm valving element movable between said first and second ports.

4. The invention as recited in claim 3 wherein said diaphragm valving element has a central aperture permitting a bleed flow therethrough when said automatic actuating means is actuated.

5. In a control device for supplying a fuel flow to burner apparatus, the combination comprising a casing having inlet and outlet means and main valve means for controlling a flow therebetween,
diaphragm means associated with said main valve means for moving the same,
said diaphragm means cooperating with a wall portion of said casing to define an operating pressure chamber whereby pressure variations therein cause operation of said main valve means,
a bleed flow chamber communicating with said operating pressure chamber,
a primary bleed flow passage between said inlet means and said bleed flow chamber,
a bleed valving chamber having first and second cavities with said first cavity communicating with said bleed flow chamber,
bleed passage means establishing communication with said second cavity and said outlet means,
a first port in said first cavity establishing communication with said inlet means to define a secondary bleed flow passage into said first cavity,
a bleed flow reservoir having an inlet communicating with said bleed passage means and an outlet communicating with said second cavity,
a second port in said second cavity controlling a bleed flow therefrom,
a diaphragm valving element defining a movable wall between said first and second cavities and having a first position wherein said first port is open and said second port is closed and a second position wherein said first port is closed and said second port is open,
a flow aperture in said diaphragm valving element establishing communication between said first and second cavities,
automatic actuating means including an actuator element having a first position engaging said diaphragm valving element to close said flow aperture and said second port and having a second position displaced from said diaphragm valving element whereby pressure in said second cavity moves said diaphragm valving element to its second position,
flow restriction means in the inlet of said bleed flow reservoir to delay pressure build up in said second cavity, and
pressure regulating means in said bleed passage means to pressure regulate the bleed flow therethrough.

6. The invention as recited in claim 5 wherein said pressure regulating means is downstream of the communicating inlet for said reservoir.

7. The invention as recited in claim 5 wherein said primary and secondary bleed flow passages each have flow restriction means therein.

8. The invention as recited in claim 5 wherein a biasing spring disposed in said second cavity biases said diaphragm valving element to its second position wherein said first and second cavities are pressure balanced.

9. The invention as recited in claim 5 wherein said first and second ports comprise annular seats oppositely disposed to each other and said diaphragm valving element moves between said seats.

10. The invention as recited in claim 9 wherein said actuator element is concentrically movable through the annular seat defined by said first port.

References Cited

UNITED STATES PATENTS 3,386,467  6/1968  Katchka.
3,351,085  11/1967  Allingham.
3,354,901  11/1967  Dietiker.

ARNOLD ROSENTHAL, Primary Examiner

U.S. Cl. X.R.

251—48